Dec. 26, 1939.   E. ABELL   2,184,806
HYDRAULIC BRAKE DISCONNECTOR
Filed May 21, 1938   2 Sheets-Sheet 1
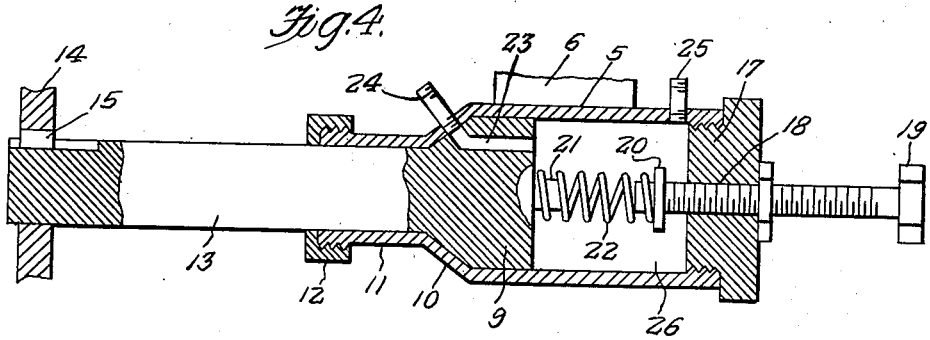
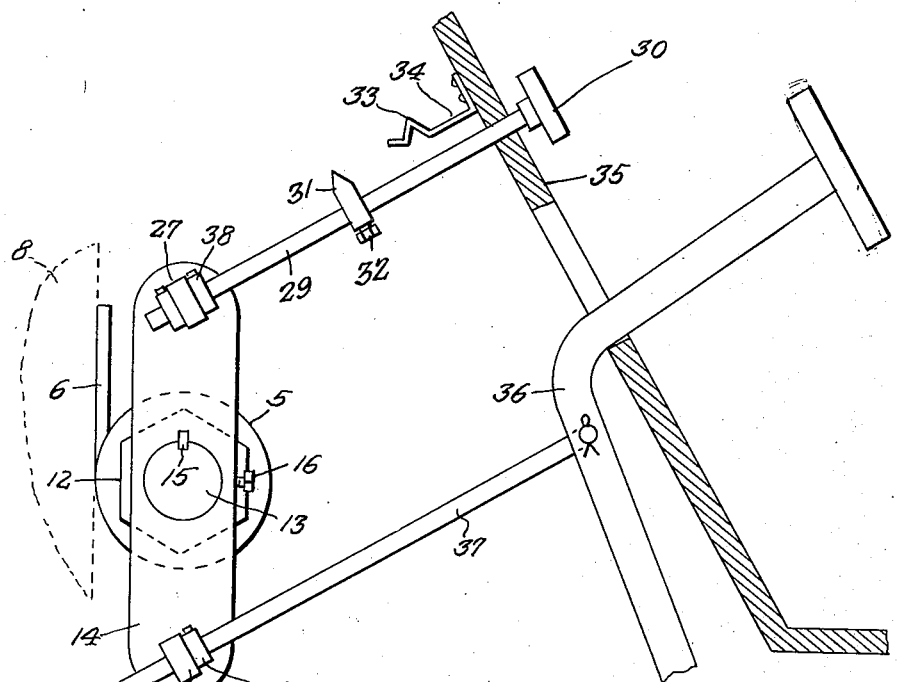
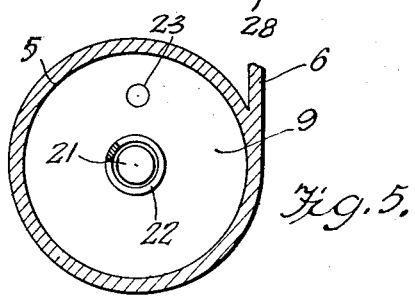
Inventor
*Everett Abell.*
By *Clarence A. O'Brien
and Hyman Berman*
Attorneys Dec. 26, 1939.   E. ABELL   2,184,806
HYDRAULIC BRAKE DISCONNECTOR
Filed May 21, 1938   2 Sheets-Sheet 2
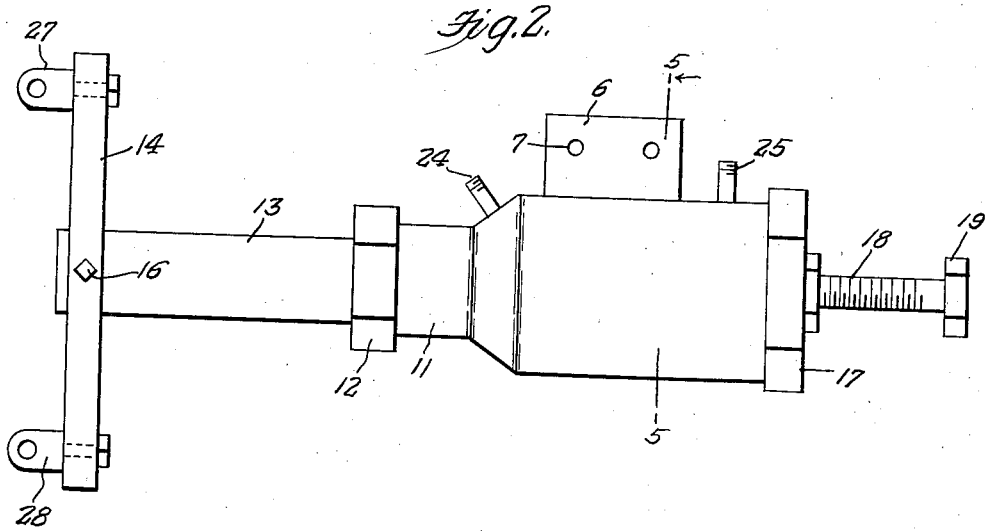
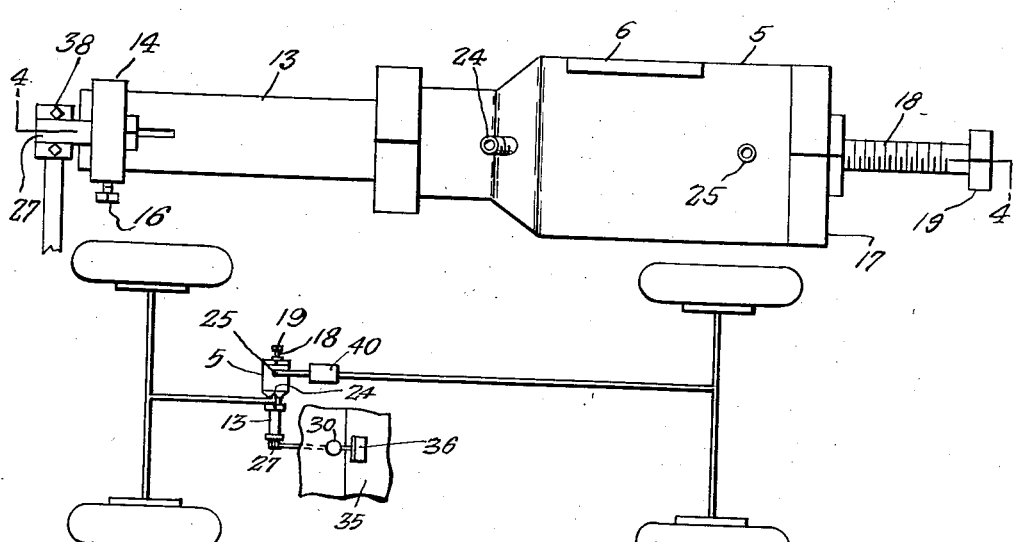
Inventor
Everett Abell,
By Clarence A. O'Brien
and Hyman Berman
Attorneys Patented Dec. 26, 1939

2,184,806

UNITED STATES PATENT OFFICE 2,184,806

HYDRAULIC BRAKE DISCONNECTOR

Everett Abell, Niagara Falls, N. Y.

Application May 21, 1938, Serial No. 209,336

2 Claims. (Cl. 192—13)

This invention appertains to new and useful improvements in hydraulic brake systems for motor vehicles and more particularly to an improvement in the systems whereby the front wheels brakes can be disconnected from the hydraulic system by simply operating the usual clutch pedal thus preventing skidding and difficulty in steering when the brakes must be applied in turning a corner, especially on a slippery street.

The principal object of the present invention is to provide a disconnector as above characterized which in operation will be positive acting and not susceptible to the ready development of defects.

Still another important object of the invention is to provide means of the character stated which will be of simple construction and easily installed.

Still another important object of the invention is to provide a disconnector for the front wheel brakes of hydraulic systems which in operation will be substantially fool-proof.

These and various other important objects and advantages of the invention will become apparent to the reader of the following specification.

In the drawings:—

Figure 1 represents a side elevational view of the apparatus showing the usual toe board in vertical section.

Figure 2 is a rear elevational view.

Figure 3 is a top plan view.

Figure 4 is a longitudinal sectional view on the line 4—4 of Figure 3.

Figure 5 is a cross section on the line 5—5 of Figure 2.

Figure 6 is a diagrammatic view of the disconnector and associate brake system.

Referring to the drawings wherein like numerals designate like parts, it can be seen that the device consists of the barrel 5 having the attaching plate 6 extending from the forward side thereof, this plate having openings 7 therein through which securing means can be disposed for securing the same to the usual flywheel housing or the like 8.

Numeral 9 denotes a rotor operative in one end portion of the barrel 5. The barrel 5 is provided with the inwardly constricted shoulder portion 10 merging with the neck 11, the free end of which is threaded to accommodate the cap 12 which can form a packing gland for the stub shaft 13 of the rotor 9, the shaft 13 having the cross bar 14 at its outer end. The key 15 between the cross bar 14 and the shaft 13 prevents rotation of the cross bar on the shaft 13 and in addition to this the set screw 16 may be employed.

The opposite end of the barrel 5 has the plug 17 extending into the same and threadedly disposed through this plug is the elongated screw 18 having the polygonal-shaped head 19 at its outer end while its inner end is formed with the flange 20 between which and the teat 21 on the rotor 9, the coiled compressible spring 22 is interposed.

The rotor 9 has the duct extending from its shoulder portion inwardly to open through its inner end. A nipple 24 extends from the shoulder portion 10 of the barrel and this may connect to a tube extending to the usual master cylinder (not shown) of the brake system.

A second nipple 25 extends from the barrel 5 and communicates with the compartment 26 of the cylinder and this may have tubular connections to the usual front wheel brakes.

Swivelled eye members 27 and 28 are provided at the upper and lower ends of the cross bar 14, the upper eye 27 receiving the lower portion of the stem 29 which extends from the push button 30, this push button having the collar 31 thereon secured in place by the set screw 32 and having the beveled end portion engageable with the angular-shaped offset 33 of the spring 34 which is secured to the toe board 35.

Extending from the shank 36 to the usual clutch pedal and pivotally secured thereto is the rod 37 the lower end of which extends through the lower swivelled eye 28. Stop collars 38 are provided on the stem 29 and rod 37 to limit action of the members through the swivelled members.

Thus it can be seen, that should the operator of the vehicle desire to disconnect the front wheels, he merely has to push down on the clutch pedal which rotates the rotor 9 and throws the duct 23 out of registration with the nipple 24, thus disconnecting the master cylinder of the brake system from the front wheels. Simultaneously the stem 29 is moved upwardly so that its block 31 engages with the offset 33 in the spring 34, thus holding the disconnector in operated position. As soon as the corner has been turned the button 30 can be depressed for disconnecting the block 31 from the detent spring 34, thus restoring the disconnector to a position communicating the braking system with the front wheel brakes.

Figure 6 is a diagrammatic view showing the present invention associated with a brake system in which the master cylinder is denoted by numeral 40.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. In combination, a hydraulic braking system including front and rear brakes, a disconnector for disconnecting the front wheel brakes, a clutch pedal, and connecting means between the disconnector and the clutch pedal for operating the disconnector when the clutch pedal is actuated.

2. In combination, a hydraulic braking system including front and rear brakes, a disconnector for disconnecting the front wheel brakes, a clutch pedal, and connecting means between the disconnector and the clutch pedal for operating the disconnector when the clutch pedal is actuated, and detent means for retaining the disconnector in operated position.

EVERETT ABELL.